(12) United States Patent
Smith

(10) Patent No.: US 8,666,945 B1
(45) Date of Patent: Mar. 4, 2014

(54) METHOD AND APPARATUS FOR UTILIZING SECURABLE OBJECTS IN A COMPUTER NETWORK

(75) Inventor: Terri-Lynn Smith, Casselberry, FL (US)

(73) Assignee: Symantec Operating Corporation, Mountain View, CA (US)

(*) Notice: Subject to any disclaimer, the term of this patent is extended or adjusted under 35 U.S.C. 154(b) by 26 days.

(21) Appl. No.: 13/246,058

(22) Filed: Sep. 27, 2011

Related U.S. Application Data

(63) Continuation of application No. 11/063,356, filed on Feb. 23, 2005, now abandoned.

(51) Int. Cl.
*G06F 17/30* (2006.01)
*G06F 15/16* (2006.01)

(52) U.S. Cl.
USPC ............................ 707/679; 707/640; 707/781

(58) Field of Classification Search
USPC .................................. 707/785, 781, 640, 679
See application file for complete search history.

(56) References Cited

U.S. PATENT DOCUMENTS

| | | | |
|---|---|---|---|
| 2002/0129047 A1* | 9/2002 | Cane et al. | 707/204 |
| 2003/0074354 A1* | 4/2003 | Lee et al. | 707/8 |
| 2004/0015723 A1* | 1/2004 | Pham et al. | 713/201 |
| 2004/0215650 A1* | 10/2004 | Shaji et al. | 707/102 |

\* cited by examiner

*Primary Examiner* — Alex Gofman
(74) *Attorney, Agent, or Firm* — Campbell Stephenson LLP

(57) ABSTRACT

A method and apparatus for utilizing a securable object in a storage management system is described. In one example, a security descriptor from a securable object is obtained. At least one security identifier (SID) and an access mask are subsequently acquired from the security descriptor by a security reference monitor (SRM). Lastly, the backup process creates a database entry that associates the securable object with the at least one SID and the access mask.

9 Claims, 3 Drawing Sheets

US 8,666,945 B1

METHOD AND APPARATUS FOR UTILIZING SECURABLE OBJECTS IN A COMPUTER NETWORK

CROSS-REFERENCE TO RELATED APPLICATIONS

This application is a continuation of U.S. patent application Ser. No. 11/063,356, entitled "Method and Apparatus for Utilizing Securable Objects in a Computer Network", filed Feb. 23, 2005, now abandoned naming Terri-Lynn Smith as inventor. This application is assigned to Symantec Operating Corporation., the assignee of the present invention, and is hereby incorporated by reference, in its entirety and for all purposes.

BACKGROUND OF THE INVENTION

1. Field of the Invention

The present invention is generally related to backup and restoration storage systems and, more particularly, to a method and apparatus for enabling a user to restore backed up data within a network file system.

2. Description of the Related Art

To provide data redundancy and security within a computer network, information stored on a client computer connected to the network is backed up to a storage system on a periodic basis. Generally, a plurality of client computers is connected, either directly or indirectly, to a backup server. The backup server serves as a primary component in a storage management system whereby the timing and control of the backup processes are performed by the backup server. The backup server generally stores the information that is to be backed up within a mass storage system or device.

Currently, the information stored on client computers in the network is periodically backed up under the direction of a system administrator. Similarly, the system administrator is responsible for restoring the data to client computers in the event of a file or disk failure since the user does not normally possess the requisite access rights. Thus, the system administrator typically restores the requested data to a designated location that the user may access. The user may then obtain the desired data from this accessible location and restore the files on a client computer. Alternatively, the administrator can restore the files to the user's computer.

Therefore, there is a need in the art for a method that enables a user to restore data directly from the backup system to a client computer in a computer network environment.

SUMMARY OF THE INVENTION

The invention provides a method and apparatus for utilizing a securable object in a computer network. In one embodiment, a security descriptor is obtained from a securable object. At least one security identifier (SID) and an access mask are subsequently obtained from the security descriptor by a security reference monitor (SRM). Lastly, the backup process creates a database entry that associates the securable object with the at least one SID and the access mask. In another embodiment, the at least one SID is obtained from an access token by the SRM upon a user logging into a client computer. Upon the user requesting file restoration, the restoration software is executed and the restoration process accesses a list of a plurality of securable objects, wherein each of the plurality of securable objects includes at least one associated SID that matches the initially obtained SID. A restoration software module subsequently obtains a request to restore at least one of the plurality of securable objects. Ultimately, at least one of the plurality of securable objects is restored to a target location by a user.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
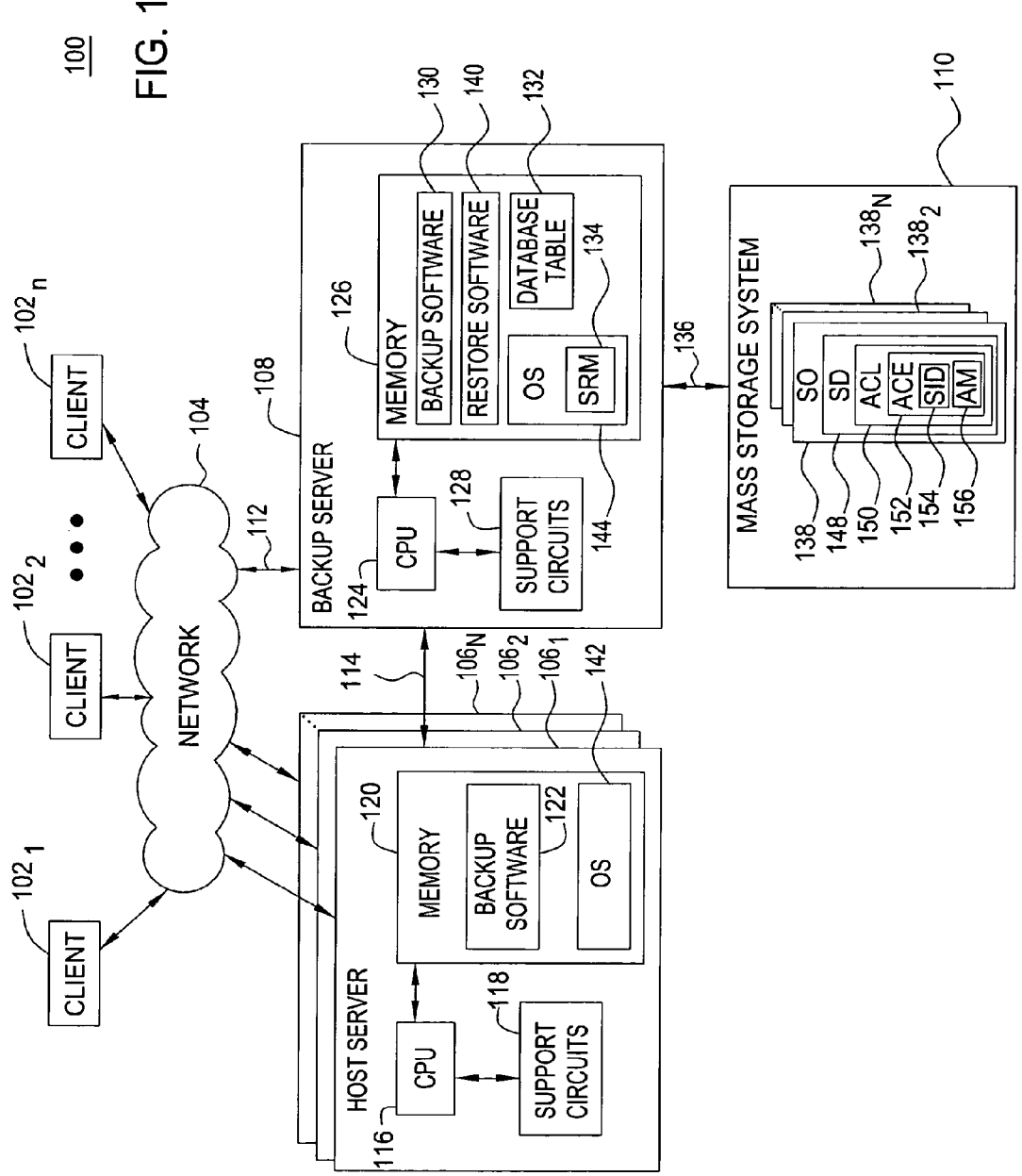
FIG. 1 depicts a block diagram of a computer network containing the present invention.

FIG. 1 is a block diagram of a computer network 100 in which one embodiment of the present invention may be utilized. The computer network comprises a plurality of client computers $102_1, 102_2 \ldots 102_n$ connected to a plurality of servers $106_1, 106_2 \ldots 106_n$ (collectively referred to as servers 106) via a network 104. The servers 106 are connected to at least one backup server 108. The connection to the backup server 108 may be through a private network 114 or connected through the public network 104 via connection 112. In some situations, both connections may be used.

The computer network 100 in FIG. 1 contains a backup system, which comprises a backup server 108 and a mass storage system 110. In one embodiment of the invention, the backup server 108 is coupled to a mass storage system 110 via path 136. Although one backup server 108 and one mass storage system 110 is depicted, those skilled in the art will understand that there may be a plurality of either backup servers or mass storage systems to provide redundancy for the network. Also, the mass storage system 110 may be a part of the backup server, may be external to the backup server, may be remotely located from the backup server, or may be shared by multiple backup servers. The mass storage system 110 may be any form of bulk storage including optical storage, tape drive storage, RAID storage, and the like. In one embodiment, the mass storage system 110 stores a plurality of securable objects $138_1, 138_2, \ldots 138_n$ (collectively referred to as securable objects 138). A securable object may comprise a file, a folder, a file system share, a printer, a registry key, an Active Directory object, a service, and the like. Alternatively, the securable objects 138 may be stored in the backup server's memory 126.

Each server 106 comprises a central processing unit (CPU) 116, support circuits 118 and memory 120. The CPU 116 may be one or more of any readily available microprocessors or microcontrollers. The support circuits 118 are well known support circuits that are used to facilitate the operation of the CPU and comprise one or more circuits such as clock circuits, cache, power supplies, input/output circuits, and the like.

The memory 120 may be any form of memory for storing software or digital information comprising one or more of random access memory, read only memory, disk drives, optical memory, flash memory, and the like. The server 106 stores in memory 120 backup software 122 that facilitates backup of information stored in the memory of at least one server 106 to the backup server 108. The memory 120 also contains an operating system 142. The operating system 142 may be one of a number of commercially available operating systems such as, but not limited to, SOLARIS from SUN Microsystems, Inc., AIX from IBM Inc., HP-UX from Hewlett Packard Corporation, LINUX from Red Hat Software, WINDOWS 2000 from Microsoft Corporation, and the like.

The backup server 108 comprises a central processing unit (CPU) 124, support circuits 128, and memory 126. As with the servers 106, the CPU 124 may be one or more of any readily available microcontrollers or microprocessors. The support circuits 128 comprise well-known circuits for support of the operation of the CPU 124. The circuits include one or more of clock circuits, cache, input/output circuits, power supplies and the like.

The memory 126 may be any form of digital memory including one or more of random access memory, read only memory, disk drives, optical storage, removable storage, and the like. The backup server memory 126 generally stores a variety of software including backup software 130, restore software 140, an operating system 144, and a database table 132. The backup software 130 is an application that, when executed, handles the backup operations pertaining to the backup server 108. Similarly, the restore software 140 is the application responsible for the restoration operations that are associated with the backup server 108. The database table 132 may be any type of database structure (i.e., collection of information) organized in such a way that a computer program can quickly select desired pieces of data. In one embodiment, the database table 132 comprises a plurality of database entries that associates security identifiers and access masks to associated securable objects (see below for descriptions). The database table 132 also includes other securable object information such as the resource name, machine name, modified flag, access flag, and time/date stamp of the file.

The operating system 142 may be one of a number of commercially available operating systems such as, but not limited to, SOLARIS from SUN Microsystems, Inc., AIX from IBM Inc., HP-UX from Hewlett Packard Corporation, LINUX from Red Hat Software, WINDOWS 2000 from Microsoft Corporation, and the like. Notably, the operating system 142 contains a security reference monitor (SRM) 134, which is a software component responsible for access control in addition to audit generation. More specifically, the SRM 134 manages the access authorization and audit generation policies that are required. The SRM 134 may also provide services for access authorization to different objects and access privileges to user accounts. Similarly, this software component also protects objects from being accessed by unauthorized users.

In operation, server 106 supports the functionality of the client computers 102 to provide data and software for utilization by the client computers 102 through the network 104. Occasionally, the backup software 122 is used to backup some or all of the data and other information within memory 120 of the server 106. The backup software 130 within backup server 108 periodically communicates with the backup software 122 within the various servers 106. The data and other information within memory 120 of the server 106 are moved to the memory 126 within the backup server 132. This backup information, which may be securable objects 138, may be held temporarily in a cache before being moved to the mass storage system 110, or the backup information may pass directly through the backup server 108 to the mass storage system 110. These two processes are known as write-back and write-through respectively.

Figure 2:
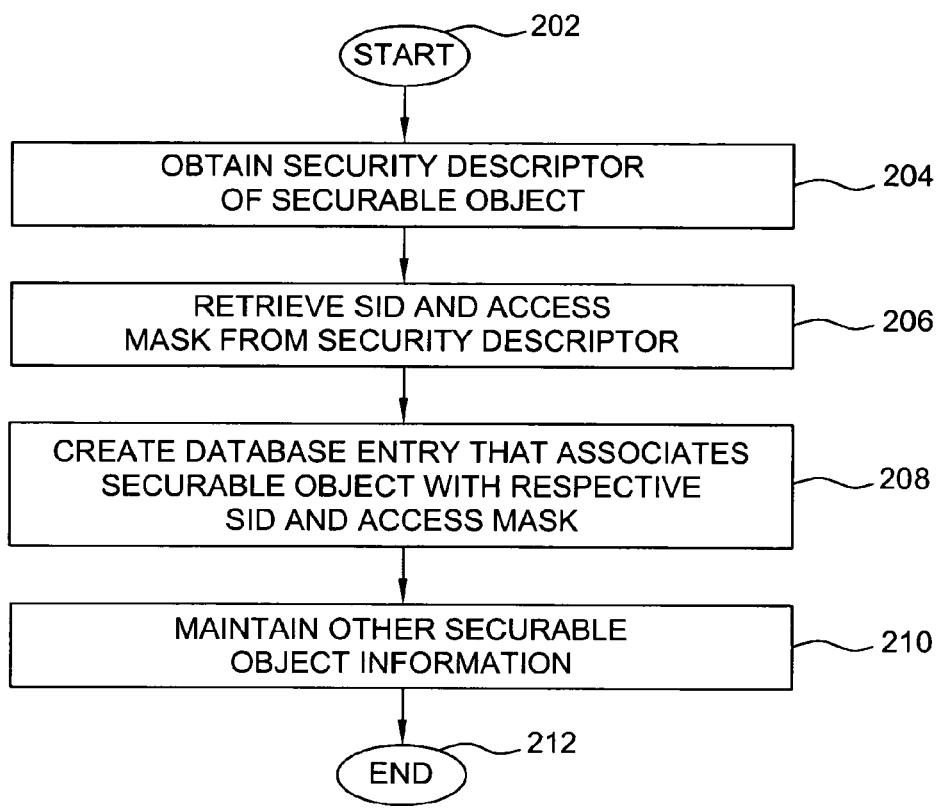
FIG. 2 depicts a flow diagram of a method of backing up a securable object in accordance with the present invention.

FIG. 2 is a flow diagram depicting an exemplary embodiment of a method 200 for backing up a securable object in accordance with the invention. The method 200 begins at step 202 and proceeds to step 204 wherein a security descriptor 148 is obtained from a securable object 138. In one embodiment, a securable object 138 may be a logical entity that is described by a distinct named set of attributes or properties. Notably, every securable object, such as a Microsoft WINDOWS object, is created with a security descriptor that governs access and auditing. The security descriptor 148 is a data structure associated with a securable object 138 that indicates which permissions are granted or denied to a specific user or group. Similarly, the security descriptor 148 contains a security identifier (SID) 154 and an access mask 156. The SID 154 comprises a variable length data structure that uniquely identifies accounts associated with a user, a group, or a computer in a given domain. The access mask 156 contains the permissions that are permitted or denied in an access control entry (ACE) 152. For example, the access mask 156 is used to request access rights (e.g., a password) when an object is opened. In one embodiment, the SID 154 and access mask 156 are contained in the ACE 152, which is an entry in an access control list (ACL) 150. Each securable object 138 may have more than one ACE 152. The ACL 150, which is a part of an securable object's security descriptor 148, is a list that grants or denies a user or group permission to the securable object 138 (i.e., the ACL 150 is the list of a given object's security properties).

At step 206, the security identifier (SID) and the access mask are retrieved from the security descriptor by the SRM 134. At step 208, the method 200 creates a database entry that associates each securable object with a respective security identifier and access mask. In one embodiment, the backup software 130 generates the database entry containing each securable object processed. The ownership SID is typically added to the database table 132. At step 210, the remaining securable object information should be maintained. In one embodiment, the additional securable object information comprises the resource name, machine name, modified flag, access flag, and time/date stamp of the file. The method 200 then proceeds to step 212 and ends. After this process is completed, a query on the database 132 using the user's login security identifier will produce a list of securable objects that is owned or accessible by the user.

Figure 3:
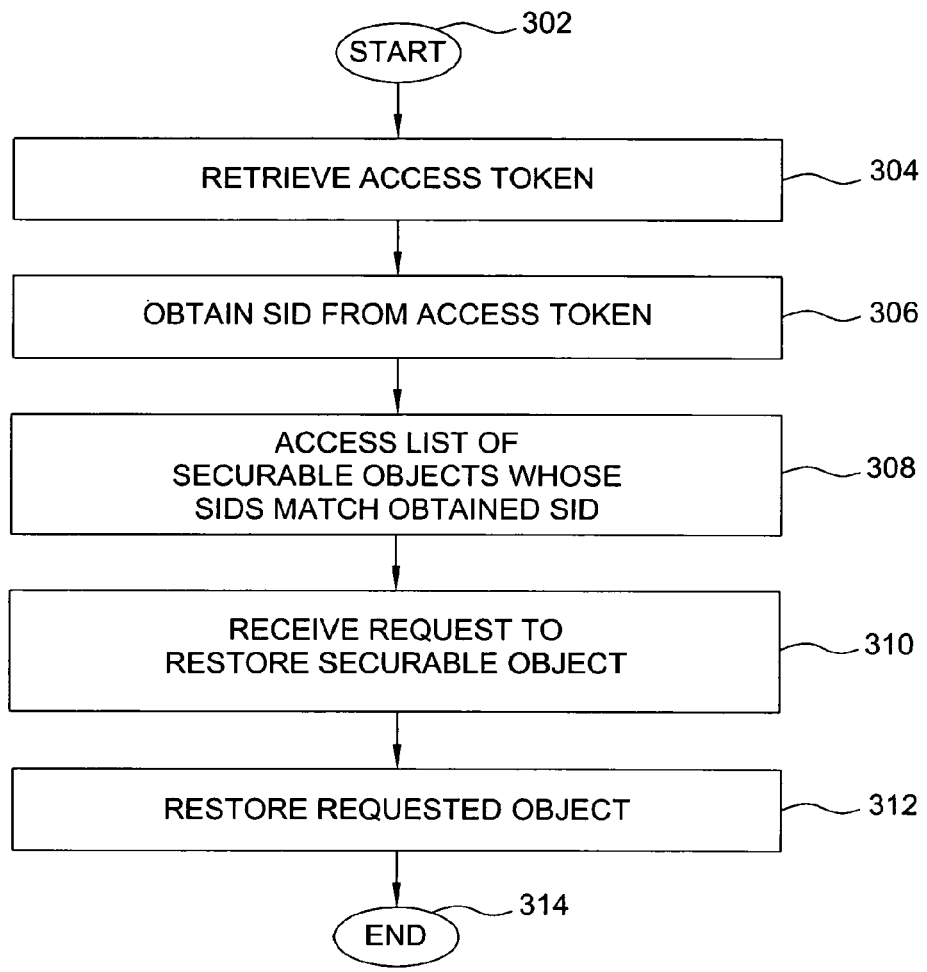
FIG. 3 depicts a flow diagram of a method of restoring a securable object in accordance with the present invention.

FIG. 3 is a flow diagram depicting an exemplary embodiment of a method 300 for restoring securable objects in accordance with the present invention. The method 300 begins at step 302 and proceeds to step 304 where an access token is obtained by the SRM 134. In one embodiment, this step occurs after a user login procedure, where the access token for a user is created by the client computer 102 during the login process. The access token typically contains the user's login security identifier (SID). Furthermore, a level of Microsoft WINDOWS impersonation (anonymous, identity, impersonate, or delegate) can be used to perform the access token creation operation.

At step 306, the SID is obtained from the access token. In one embodiment, the SRM 134 initially acquires the SID 154 during the login process referred in step 304. The restore software 140 subsequently obtains the SID 154 from the SRM 134. At step 308, the restore software 140 accesses a list of securable objects whose security identifiers match the obtained SID. The SID may be an ownership SID or a trustee SID. An ownership SID is the SID that the securable object is initially created with. A trustee SID is any SID replaced or assigned to the securable object after the securable object is created. In one embodiment, the restore software 140 creates an ownership/authorization view by comparing the user's login SID against all of the security identifiers that exist in the database table 132 (e.g., SIDs created during the backup process). In the event a securable object's SID matches the login SID (e.g., ownership or trustee SID), the object is added to a list for display under the user's name in an ownership/authorization view. In one embodiment, a complete list of securable objects with matching SIDs is ultimately displayed to the user in the ownership/authorization view. In another embodiment, this list enables the invention to display the attributes of a securable object, e.g., the owner name, resource name, machine name, and the like. Furthermore, the administrator is also able to enter a list of users or allow a user to enter his/her own name and password in order to view and/or restore the data that was backed up by the administrator for the user.

At step 310, a request to restore at least one securable object 138 is received. In one embodiment, the user selects a file (or files) to be restored. This request is then received by the restore software 140. At step 312, the requested object is restored by the restore software 140. In one embodiment, the requested securable object 138 is restored to a target site (e.g., the client computer) designated by the user. Thus, the present invention allows the user to restore his own data or alternatively, allows the system administrator to obtain a list of securable objects listed by owner name. The method 300 continues to step 314 and ends.

In one embodiment of the present invention, a mechanism is provided to enable the administrator to change a user's SID throughout the database to a different database that the administrator can access. This allows the data to be reclaimed or reassigned by the system administrator. Further, another mechanism may be provided for the administrator to change the access mask on each securable object belonging to a specific user's SID. The system administrator may then use this operation to deny a specific user the ability to restore data that was previously allowed.

The present invention enables users to independently restore data backed up by a system administrator. By utilizing a security identifier that is unique to a particular user or group, a user may securely restore data provided the user owns or is authorized to access a particular object. The present invention also employs a security measure that enables a system administrator to change a user's SID in the instance the user is no longer privileged to access a particular securable object.

While the foregoing is directed to embodiments of the present invention, other and further embodiments of the invention may be devised without departing from the basic scope thereof, and the scope thereof is determined by the claims that follow.

The invention claimed is:

1. A method comprising:
performing a backup of a plurality of securable objects;
obtaining a security descriptor from a securable object of the plurality of securable objects;
identifying at least one security identifier (SID) and an access mask from the security descriptor;
creating a database entry in a database table in response to the performing the backup, wherein
  the database entry identifies an association between the securable object, the at least one SID, and the access mask;
obtaining an access token, wherein
  the access token is created during a login procedure;
extracting a first security identifier (SID) from the access token;
comparing the first SID with information stored in the database table, wherein
  the information identifies a user who owns or is permitted to access the plurality of securable objects,
  each of the plurality of securable objects comprises a respective logical entity, and
  each respective logical entity comprises at least one of a file, a folder, a file system share, a printer, a registry key, an Active Directory object, or a service;
generating a list of securable objects in response to the comparing, wherein
  each of the securable objects identified in the list of securable objects comprises at least one SID that matches the first SID, and
  generating the list comprises
    adding to the list first information based on a first ownership SID, wherein
      the first information is configured to identify a first securable object, and
      the first ownership SID was created concurrently with the first securable object, and
    adding to the list second information based on a first trustee SID, wherein
      the second information is configured to identify a second securable object, and
      the first trustee SID was created after the second securable object; and
restoring at least one securable object of the list of securable objects in response to receiving a request to restore the at least one securable object.

2. The method of claim 1, further comprising:
changing the at least one SID, wherein
  the at least one SID is changed to a different database, and
  the different database is accessible by a system administrator.

3. The method of claim 1, further comprising:
changing the access mask of the securable object, wherein
  the access mask of the securable object is changed to deny restoration of the securable object.

4. A non-transitory computer readable storage medium comprising instructions executable to:
perform a backup of a plurality of securable objects;
obtain a security descriptor from a securable object of the plurality of securable objects;
identify at least one security identifier (SID) and an access mask from the security descriptor;

create a database entry in a database table in response to
    performing the backup, wherein
    the database entry identifies an association between the
        securable object, the at least one SID, and the access
        mask;
obtain an access token, wherein
    the access token is created during a login procedure;
extract a first security identifier (SID), wherein
    the security identifier is extracted from the access token;
compare the first SID with information stored in the database table, wherein
    the information identifies a user who owns or is permitted to access the plurality of securable objects,
    each of the plurality of securable objects comprises a respective logical entity, and
    each respective logical entity comprises at least one of a file, a folder, a file system share, a printer, a registry key, an Active Directory object, or a service;
generate a list of securable objects in response to comparing the SID with the information, wherein
    each of the securable objects identified in the list of securable objects comprises at least one SID that matches the first SID, and
    generating the list comprises
        adding to the list first information based on a first ownership SID, wherein
            the first information is configured to identify a first securable object, and
            the first ownership SID was created concurrently with the first securable object, and
        adding to the list second information based on a first trustee SID, wherein
            the second information is configured to identify a second securable object, and
            the first trustee SID was created after the second securable object; and
restore at least one securable object of the list of securable objects in response to receiving a request to restore the at least one securable object.

5. The non-transitory computer readable storage medium of claim 4, wherein the program instructions are further executable to:
    change the at least one SID, wherein
        the at least one SID is changed to a different database, and
        the different database is accessible by a system administrator.

6. The non-transitory computer readable storage medium of claim 4, wherein the program instructions are further executable to:
    change the access mask of the securable object, wherein
    the access mask of the securable object is changed to deny restoration of the securable object.

7. A system comprising:
one or more processors;
memory coupled to the one or more processors, wherein
    the memory stores program instructions executable to
    perform a backup of a plurality of securable objects;
    obtain a security descriptor from a securable object of
        the plurality of securable objects;
    identify at least one security identifier (SID) and an
        access mask from the security descriptor;
    create a database entry in a database table in response to
        performing the backup, wherein
        the database entry identifies an association between
            the securable object, the at least one SID, and the
            access mask;
    obtain an access token, wherein
        the access token is created during a login procedure;
    extract a first security identifier (SID), wherein
        the security identifier is extracted from the access
            token;
    compare the first SID with information stored in the
        database table, wherein
        the information identifies a user who owns or is permitted to access the plurality of securable objects,
        each of the plurality of securable objects comprises a respective logical entity, and
        each respective logical entity comprises at least one of a file, a folder, a file system share, a printer, a registry key, an Active Directory object, or a service;
    generate a list of securable objects in response to comparing the SID with the information, wherein
        each of the securable objects identified in the list of securable objects comprises at least one SID that matches the SID, and
        generating the list comprises
            adding to the list first information based on a first ownership SID, wherein
                the first information is configured to identify a first securable object, and
                the first ownership SID was created concurrently with the first securable object, and
            adding to the list second information based on a first trustee SID, wherein
                the second information is configured to identify a second securable object, and
                the first trustee SID was created after the second securable object; and
    restore at least one securable object of the list of securable objects in response to receiving a request to restore the at least one securable object.

8. The system of claim 7, wherein the program instructions are further executable to:
    change the at least one SID, wherein
        the at least one SID is changed to a different database, and
        the different database is accessible by a system administrator.

9. The system of claim 7, wherein the program instructions are further executable to:
    change the access mask of the securable object, wherein
    the access mask of the securable object is changed to deny restoration of the securable object.

* * * * *